US006654875B1

(12) United States Patent
Hartnett et al.

(10) Patent No.: US 6,654,875 B1
(45) Date of Patent: Nov. 25, 2003

(54) DUAL MICROCODE RAM ADDRESS MODE INSTRUCTION EXECUTION USING OPERATION CODE RAM STORING CONTROL WORDS WITH ALTERNATE ADDRESS INDICATOR

(75) Inventors: Thomas D. Hartnett, Roseville, MN (US); John S. Kuslak, Blaine, MN (US); Peter B. Criswell, Bethel, MN (US); Wayne D. Ward, New Brighton, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/572,511

(22) Filed: May 17, 2000

(51) Int. Cl.⁷ .................................................. G06F 9/30
(52) U.S. Cl. ........................ 712/211; 712/200; 712/229
(58) Field of Search ................................. 712/229, 243, 712/200, 211

(56) References Cited

U.S. PATENT DOCUMENTS

| 4,691,278 A | * | 9/1987 | Iwata | 712/229 |
| 4,736,289 A | * | 4/1988 | Eaton | 712/229 |
| 5,123,096 A | * | 6/1992 | Matuo | 712/212 |

* cited by examiner

*Primary Examiner*—Kenneth S. Kim
(74) *Attorney, Agent, or Firm*—Charles A. Johnson; Mark T. Starr; Crawford Maunu PLLC (57) ABSTRACT

Instruction processor and method supporting dual-mode execution of computer instructions. In various embodiments, certain instructions are executable in one of two modes. The first mode is compatible with the native instruction set and data words, and the second mode is an adaptation suitable for platform independent instructions. A control word RAM is addressed by the operation code of an instruction, and each word in the control word RAM includes an address into a microcode RAM. The address into the microcode RAM is manipulated in accordance with the various embodiments to reference either a first set of microcode for native instructions and data words, or a second set of microcode for execution in a platform-independent mode.

17 Claims, 6 Drawing Sheets

DUAL MICROCODE RAM ADDRESS MODE INSTRUCTION EXECUTION USING OPERATION CODE RAM STORING CONTROL WORDS WITH ALTERNATE ADDRESS INDICATOR

RELATED APPLICATIONS/PATENTS

The present application is related to the following U.S. patent applications, both assigned to the assignee of the present invention and incorporated herein by reference:

"PIPELINE DEPTH CONTROLLER FOR AN INSTRUCTION PROCESSOR" to Hartnett et. al., filed on Oct. 15, 1999 and having application Ser. No. 09/419,439

"PIPELINE CONTROLLER FOR PROVIDING INDEPENDENT EXECUTION BETWEEN THE PRELIMINARY AND ADVANCED STAGES OF A SYNCHRONOUS PIPELINE" to Hartnett et. al., filed on Dec. 20, 1999 and having application Ser. No. 09/468,051.

FIELD OF THE INVENTION

The present invention generally relates to computer instruction processors, and more particularly to instruction processors adapted for execution of platform-independent code.

BACKGROUND OF THE INVENTION

Platform-independent programming languages, for example, Java and Active-X, offer significant advantages over traditional, platform-specific languages. A platform-independent programming language typically supports programs that are executable on multiple hardware platforms independent of the native instruction sets of the hardware platforms. A hardware platform typically includes a computer system having one or more processors (e.g., microprocessors or microcontrollers) which execute a particular set of instructions having a specific format, which is sometimes referred to as the native instruction set. A platform-independent programming language is distinguished from a platform-specific language in that the platform-specific language requires a platform-specific compiler to generate program code including instructions from the native instruction set.

Most platform-independent program code is translated from source code to an intermediate code format, which is then interpreted. The intermediate codes of Java are referred to as "bytecodes," for example. The intermediate codes are executed by a software interpreter, which executes precompiled native instruction routines according to the particular bytecodes. Consequently, the intermediate codes are executable on any computer system having a suitable interpreter.

Many platform-independent programs are relatively compact, which makes them suitable for downloading over a network or modem. Moreover, since the program code is platform-independent, the source computer system (or "server") can download the same program code irrespective of the particular hardware platform of the target computer system (or "client"). Thus, the distribution of software via the Internet is expected to increasingly be in the form of platform-independent programs.

A problem presented in processing platform-independent program code on some clients is that there may not be a direct correspondence between the word size of the platform-independent program code and the word size of the client. For example, the bytecodes of the platform-independent code may be 32 bits and the client system may be a 36-bit machine. In addition, there may be differences in the manner in which data is represented and arithmetic is performed, for example, twos-complement versus ones-complement. These differences between the platform-independent code and the client can be handled with programming techniques implemented in the interpreter of the client. However, the additional software may drastically reduce the speed at which the platform-independent code is executed.

A system and method that addresses the aforementioned problems, as well as other related problems, is therefore desirable.

SUMMARY OF THE INVENTION

In various embodiments, the invention provides a method and apparatus for dual-mode execution of computer instructions. Certain instructions are executable in one of two modes. The first mode is compatible with the native instruction set and data words, and the second mode is an adaptation suitable for platform independent instructions. Initially, a control word RAM is addressed by the operation code of an instruction, and each word in the control word RAM includes an address into a microcode RAM. The address into the microcode RAM is manipulated in accordance with the various embodiments to reference either a first set of microcode suitable for native instructions and data words, or a second set of microcode for execution in a platform-independent mode.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION

The present invention is believed to be applicable to a variety of instruction processor arrangements and various platform-independent programming languages. The invention has been found to be particularly applicable and beneficial in a pipeline instruction processor. While the present invention is not so limited, an appreciation of the present invention is presented by way of circuitry suitable for such a processor.

Figure 1:
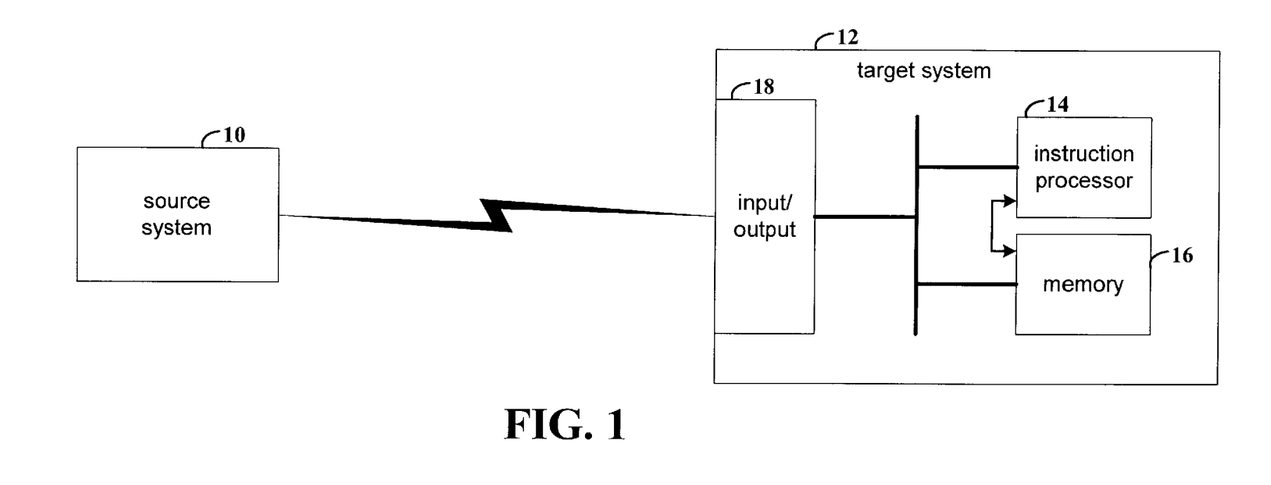
FIG. 1 is a block diagram of a computing arrangement for execution of platform independent programs.

FIG. 1 is a block diagram of a computing arrangement for execution of platform independent programs. The arrangement includes a source system 10 coupled to a target system 12 via a network, for example. Source system 10 may be a data processing system that is suitable for hosting web server software, and target system 12 is a data processing system that is suitable for execution of platform independent programs. For example, target system 12 is a 2200 Series data processing system from Unisys.

Target system 12 includes instruction processor 14, memory 16, and input/output (I/O) section 18. The invention is not intended to be limited by the architecture of target system 12, which is illustrated for the purpose of illustrating a system in which the invention could be implemented. A general flow for processing a platform-independent program is as follows. In response to a request from target system 12, source system 10 sends a platform-independent program to the target system. The target system is configured with an interpreter that is suitable for interpreting and executing the platform-independent program. The interpreter is itself a program comprised of instructions that are native to instruction processor 14.

In accordance with one embodiment of the invention, instruction processor 14 is adapted to process instructions in one of two modes. In the first mode, the instruction processor executes native instructions in a "normal" manner. In the second mode, native instructions are executed in an alternative manner, which is adapted for the platform-independent code. For example, native instructions executed in the normal mode are microcoded to process 36-bit data words (comprised of 9-bit bytes). The alternative mode of executing native instructions is provided to accommodate a different length data word on which the platform-independent code operates, for example 32 bits (8-bit bytes). The microcode in the alternative mode is adapted to process data words of the length used by the platform-independent code.

Figure 2:
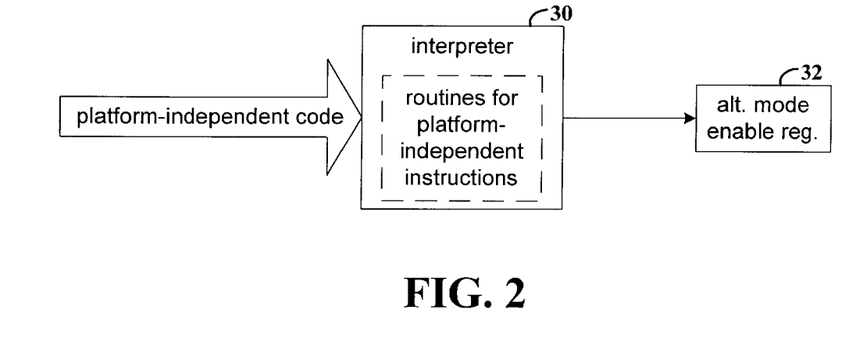
FIG. 2 is a block diagram illustrating a partial data flow in the execution of a platform-independent program.

FIG. 2 is a block diagram illustrating a partial data flow in the execution of a platform-independent program. Interpreter 30 is a program that executes on target system 12. The interpreter is comprised of various routines programmed in the native instruction set of the target system. The routines interpret the instructions of the input program-independent code and execute one or more native instructions to perform the functions specified by the program-independent code.

Certain ones of the native instructions of target system 12 are executed in one of two modes, depending on whether platform-independent code is being executed. To support the first mode, the instructions are microcoded in accordance with the size of a data word defined by the architecture of system 12 (e.g., 36 bits). To support the second mode, the instructions are microcoded to process data words of the size defined by the platform-independent code (e.g., 32 bits). Thus, a single instruction can be used for both native programs and in the interpretation of platform-independent programs. To reduce the proliferation of special-purpose instructions, a single instruction has two different sets of microcode for the two execution modes, respectively. Rather than manipulating the layout of data in the platform-independent code with native instructions to accommodate native instruction processing of the data, a native instruction is microcoded to function with both sizes of data words, with the size depending on whether a platform-independent program is being interpreted.

To signal instruction processor 14 when a platform-independent program is being interpreted, and therefore when to execute instructions in the second alternative mode, interpreter 30 is programmed to set a bit in register 32. Register 32 enables execution of certain instructions in the alternative mode. The alternative-mode microcode for the instructions is generally programmed for the operations described in the following paragraphs.

In 2200 instructions, for example, the "j" field in an instruction selects zero-extension or sign-extension of the operand and the number of bytes (1, 2, or 4) occupied by the operand. Generally, the microcode for processing instructions performs sign-extension on operands in a manner consistent with the size of the operand (e.g., 36-bit versus 32-bit operands.

A sampling of 2200 system instructions that include both normal and alternative execution modes include: Load A, Add to A, Double Load A, Double-precision Fixed-point Add, Load X, Multiply Integer, Store ASCII Spaces, Add Decimal, Test Equal, Test Even Parity, Masked Test Equal, Single Shift Circular, and Jump Positive. Those skilled in the art will recognize that many other 2200 system instructions are candidates for both normal and alternative execution modes. In addition, instructions of machines having different architectures may benefit from the present invention.

Figure 3:
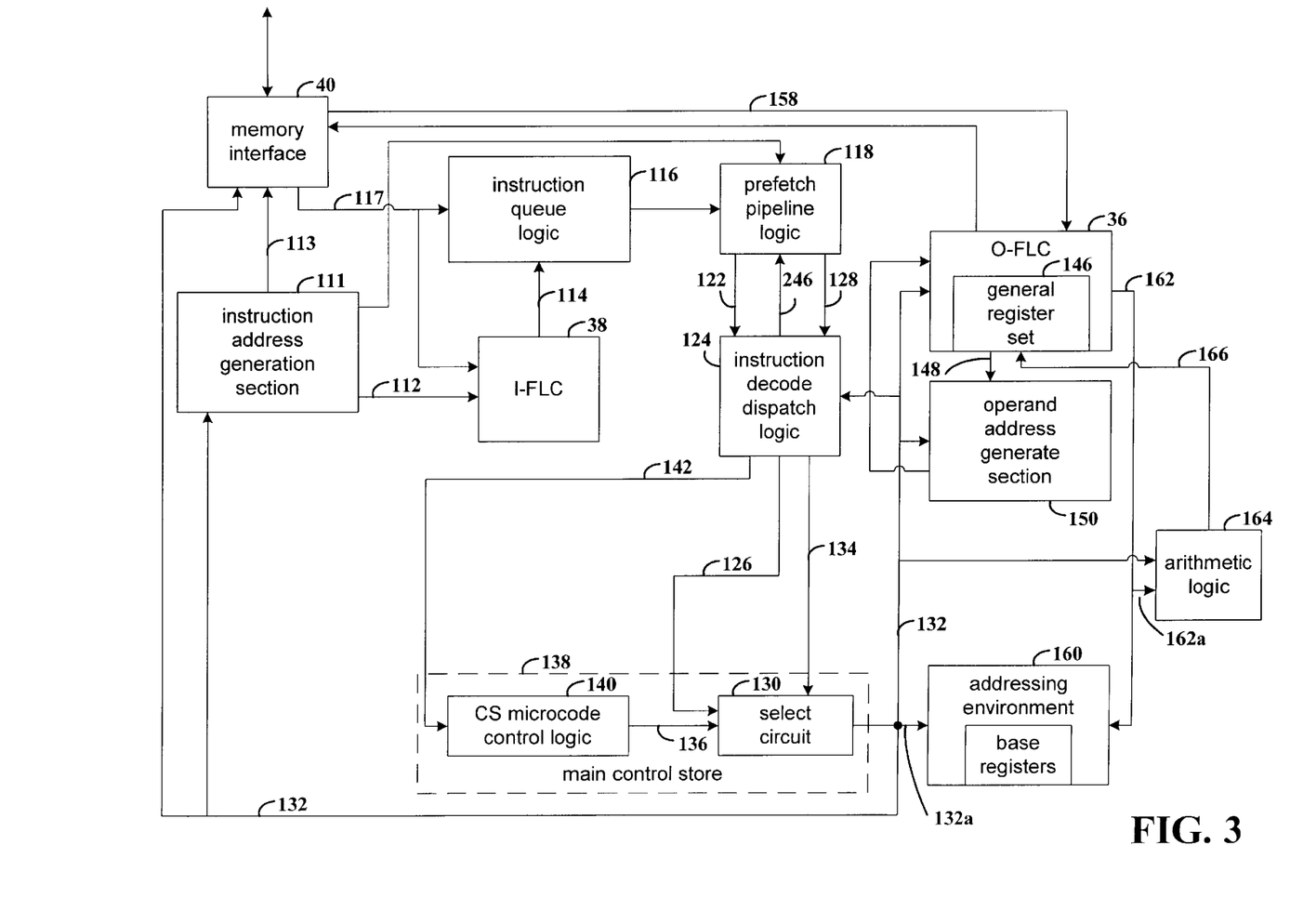
FIG. 3 is a functional block diagram of the major sections of an instruction process in accordance with one embodiment of the invention.

Before describing the circuitry associated with the dual-mode instruction execution associated with platform-independent instructions, an overview of the instruction processor in which the circuitry is implemented is described in association with FIG. 3.

FIG. 3 is a functional block diagram of the major sections of an instruction process in accordance with one embodiment of the invention. Although this figure does not provide a complete view of all data, address, and control paths, a subset of these paths is shown to facilitate an understanding of how the various IP sections interact.

The IP of the preferred embodiment includes instruction address generate section 111 that provides logic that generates an absolute instruction address by adding a relative address to the address of a designated base register within the IP. The absolute instruction address is provided to a tag memory (not shown) to determine if the addressed instruction is located in the I-FLC 38. If the instruction is resident in the I-FLC, the address is provided on line 112 to the I-FLC so the addressed instruction may be retrieved and provided on line 114 to instruction queue logic 116. If the address is not resident in the I-FLC, the address is provided on line 113 to memory interface 115, which forwards the address on line 40 to the second-level cache (not shown). When the instruction becomes available, it is provided to the I-FLC and to instruction queue logic 116 on line 117. In this instance, some processing delay is introduced into the instruction pipeline.

In general, an instruction stored in instruction queue logic 116 prior to entering the decode stages of the pipeline. Instruction queue logic includes a storage device that stores a predetermined number of instructions, which in one embodiment is eight. Each retrieved instruction remains stored in the instruction queue logic until it enters the initial decode stage. If the instruction queue logic does not store any instructions, an instruction read from I-FLC 38 is provided immediately to the pre-decode logic without first being stored in the instruction queue logic.

The pre-fetch decode stages for an instruction are performed in pre-fetch pipeline logic 118. This logic receives an instruction from the instruction queue logic via the interface shown as line 120. This logic performs the decode operations that generate the hardware signals to control instruction execution.

Pre-fetch pipeline logic 118 provides hardware signals on line 122 to instruction dispatch logic 124, which in turn forwards these signals to the rest of the IP on line 126. Additionally, the pre-fetch pipeline logic provides the instruction on line 128 to instruction dispatch logic 124 to generate additional hardware control signals.

For standard instructions, the signals provided by instruction dispatch logic 124 via line 126 are selected by select circuit 130 to be provided to all parts of the IP on line 132. As discussed previously, these signals provide the hardware control sequences necessary to complete execution of the standard instruction. Selection of the signals on line 126 is controlled by the select CS control signal on line 134 generated by instruction dispatch logic 124. For non-standard instructions, the select CS control signal instead selects signals on line 136 to be provided to the various IP logic sections. The signals on line 136 are generated by main control store section 138. Main control section 138 includes CS microcode control logic 140, which is a microcode-controlled sequencer that is initially enabled by address and control signals provided on line 142 by dispatch logic 124. The microcode-controlled sequencer executes microcode instructions stored within a memory device embedded within the main control store section. The signals on line 136 control IP execution during the extended execution cycles for non-standard instructions. For more information on microcode-controlled pipeline execution of extended-mode instructions, see U.S. Pat. No. 5,577,259 to Alferness et al. entitled "Cooperative Hardware and Microcode Control System for Pipelined Instruction Execution", assigned to the assignee of the current invention.

The control signals on line 132 are provided to all sections of the IP to control instruction execution. These control signals include addresses that are stored in general register set 150. In response, operand address generate section 150 generates an operand absolute address, which is transferred to operand first-level cache (O-FLC) 36 on lines 152. After the absolute operand address has been received by O-FLC 36, the O-FLC logic determines whether the operand is resident in the O-FLC. If the operand is not resident, the IP suspends instruction execution and initiates a memory read over lines 154 to memory interface 115. In response, memory interface 115 initiates a request to the second-level cache over interface 40. After the operand is returned on interface 40 to the memory interface, the operand is provided to O-FLC 36 on line 158.

Operand data is provided to addressing environment logic 160 over path 162, where it is used in conjunction with the addressing signals provided on line 132a to generate the next operand cache address Operand data is further made available over line 162a to arithmetic logic 164. The arithmetic logic 164 performs the multiply/divide, floating point, and decimal arithmetic operations. The results are stored back to GRS 146 over line 166.

Figure 4:
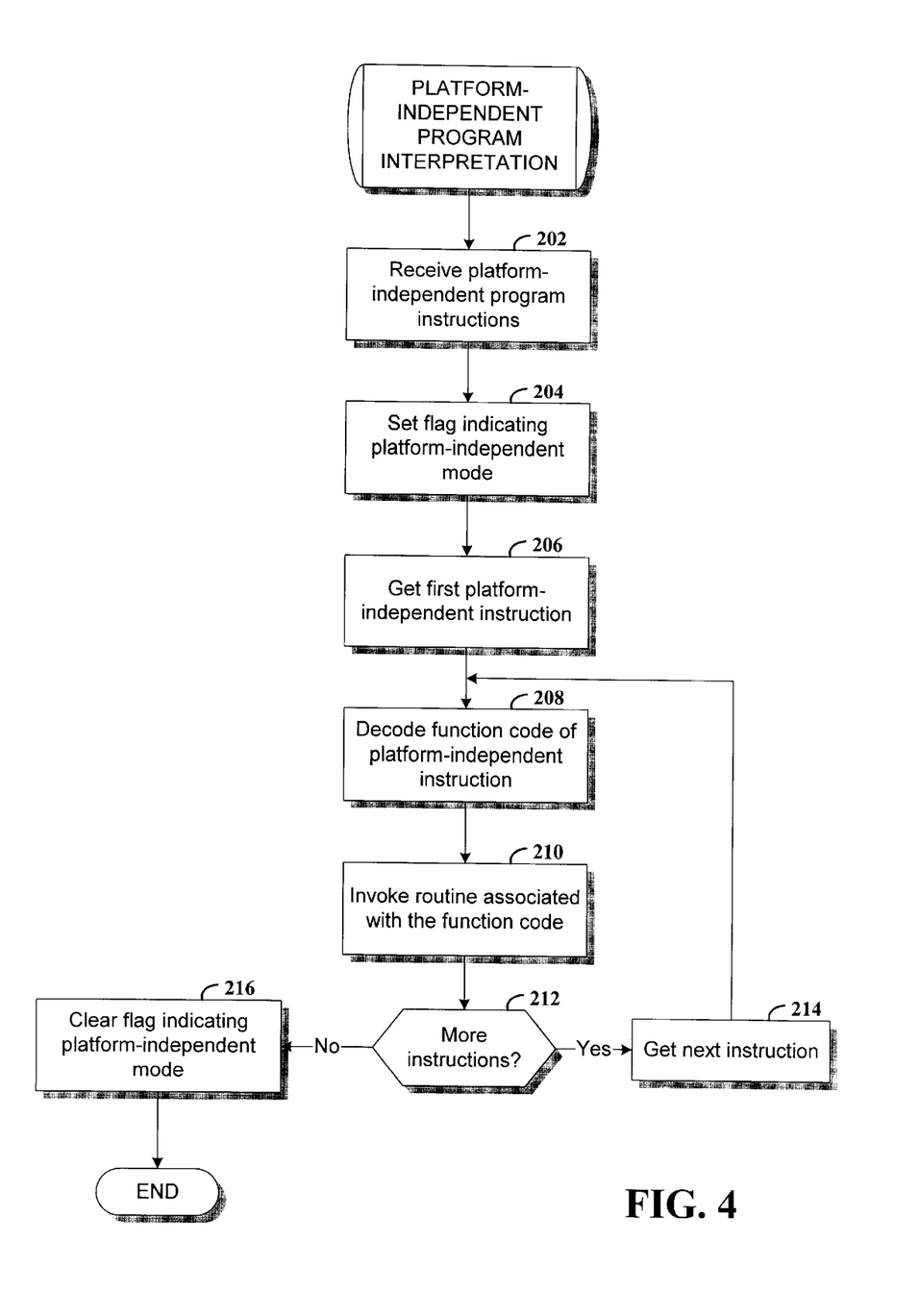
FIG. 4 is a flowchart of a process for interpreting and performing the functions specified in a platform-independent program.

FIG. 4 is a flowchart of a process for interpreting and performing the functions specified in a platform-independent program. At step 202, platform-independent instructions that comprise a program are received by the target system. For example, the program may be received via Web-server software that is hosted on the target system. The instructions are then passed to the interpreter for decoding and performing the appropriate functions.

At step 204, a hardware flag is set to signal to the instruction processor that certain instructions are to be executed in the alternative mode. The first platform-independent instruction is read at step 206, and the instruction is decoded at step 208. At step 210, the routine that is associated with the instruction is initiated to perform the associated function. As described above, the function is performed by executing a sequence of native instructions, some of which have an alternative mode of execution that is used in processing platform-independent programs.

Decision step 212 tests whether there are more instructions to process. If so, the next instruction is read at step 214, and processing continues at step 208.

When there are no more platform-independent instructions to process, the interpreter clears the hardware flag at step 216. This signals to the instruction processor that subsequent instructions are to be executed in the normal mode and not in the alternative mode.

Figures 5A, 5B:
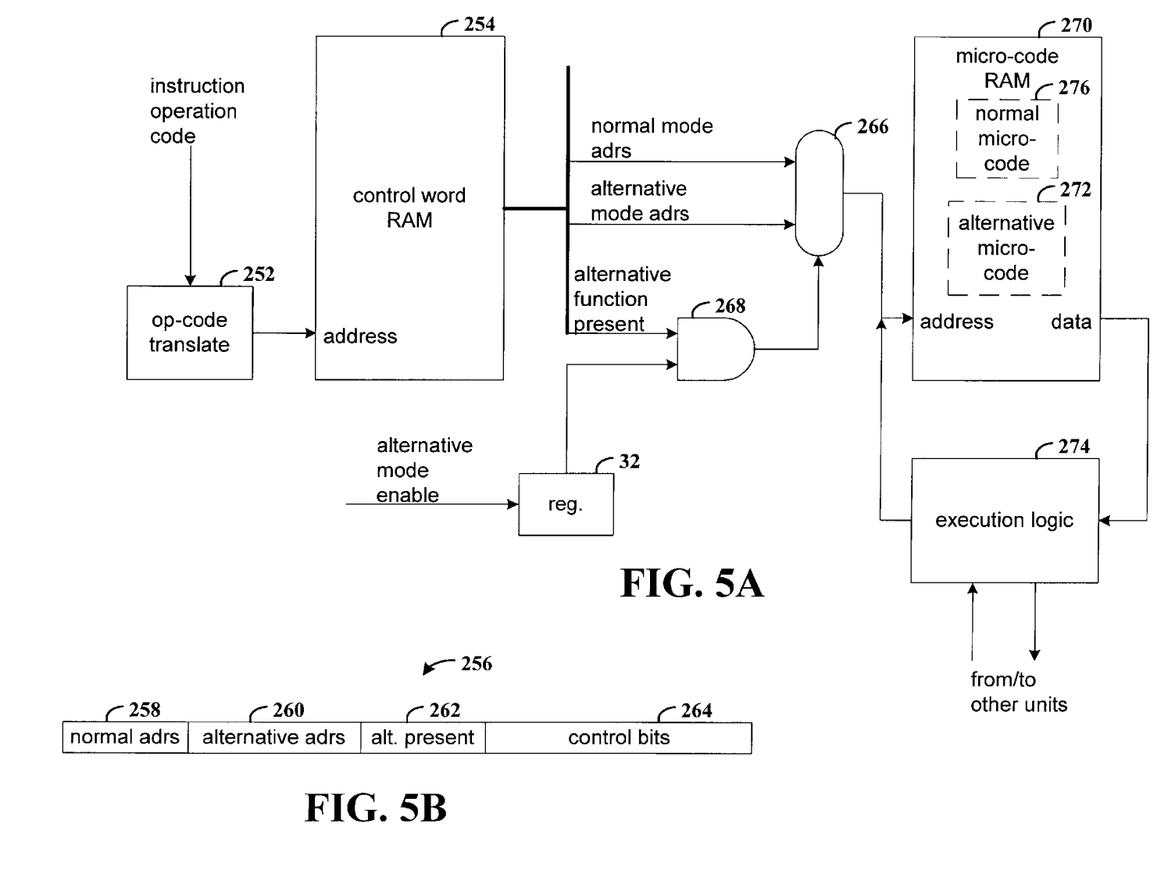
FIG. 5A is a functional block diagram of a circuit arrangement for executing instructions in a normal mode and in an alternative mode in accordance with one embodiment of the invention.
FIG. 5B illustrates the layout of a control word in RAM 254 in accordance with an example embodiment.

FIG. 5A is a functional block diagram of a circuit arrangement for executing instructions in a normal mode and in an alternative mode in accordance with one embodiment of the invention. The arrangement of FIG. 5A is generally implemented within pre-fetch pipeline logic 118 of FIG. 3 in one embodiment. The operation code of an instruction is input to translate element 252, which translates the operation code into an address for input to control word RAM 254. Note that in the example embodiment, a direct addressing of an operation code to RAM 254 is not feasible since there more bits in the operation code than addresses into the control RAM.

FIG. 5B illustrates the layout of a control word in RAM 254 in accordance with an example embodiment. Control word 256 includes address 258 for normal mode microcode, address 260 for alternative mode microcode, flag 262 to indicate that the alternative mode applies to the present instruction, and various control bits 264.

The microcode addresses 258 and 260 of the addressed word from control word RAM 254 are is provided as inputs to selector 266. The value of flag 262 is provided as an input signal to AND gate along with the signal output from register 32 (which indicates whether the interpreter is processing platform-independent code). If the instruction is of the type that supports an alternative mode (flag 262) and platform independent instructions are being interpreted (register 32), then selector 266 selects the alternative mode address for input to microcode RAM 270. The alternative address references alternative microcode 272, which is read and output to execution logic 274. Execution logic 274 controls the other functional units of the instruction processor which perform the actual function(s) designated by the instruction. Additional microcode fetches may be initiated by execution logic 274 with an address input to RAM 270.

Microcode set 276 is addressed when platform-independent code is not being processed.

Figure 6:
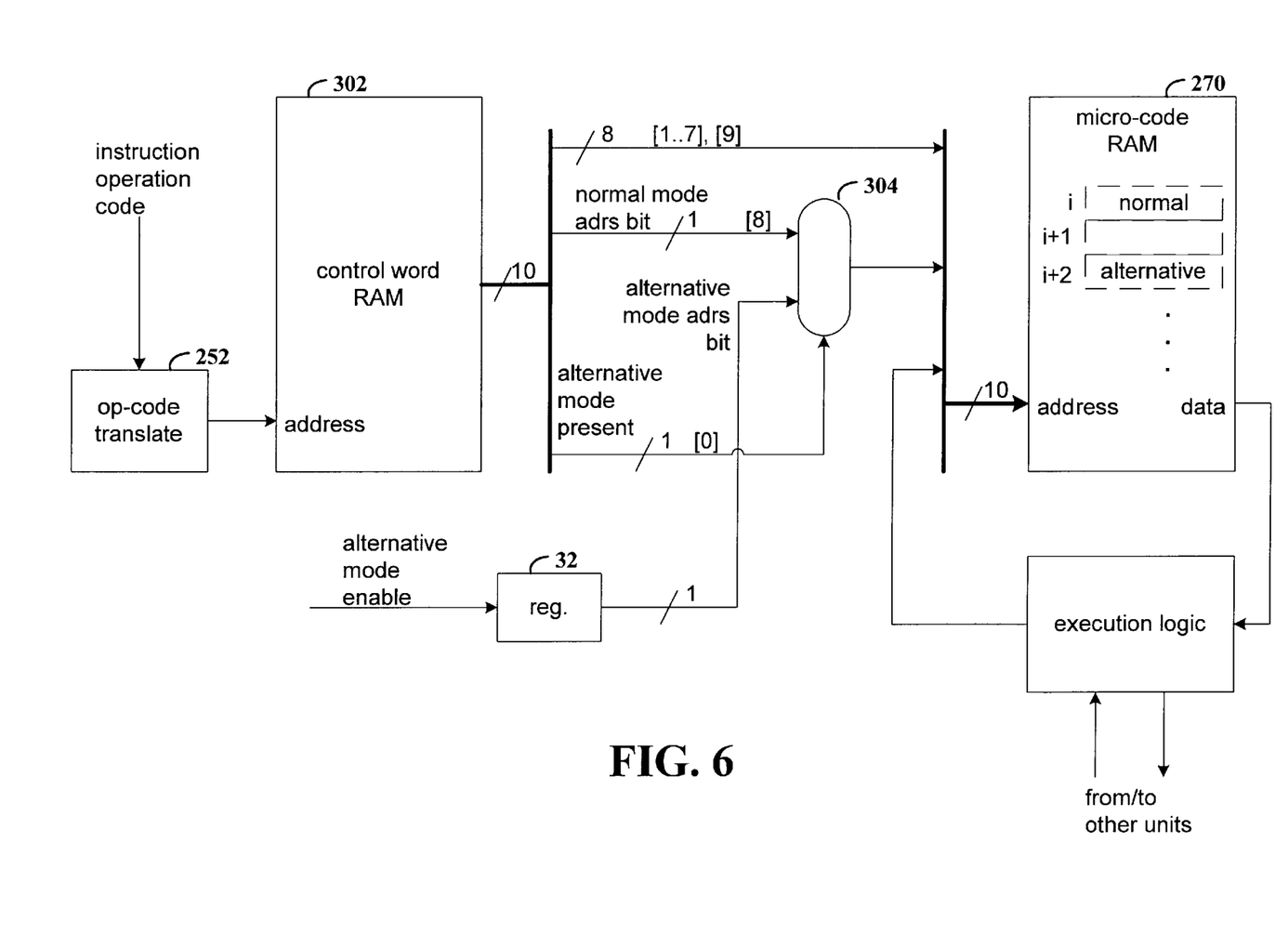
FIG. 6 is a functional block diagram of a circuit arrangement for executing instructions in a normal mode and in an alternative mode in accordance with another embodiment of the invention.

FIG. 6 is a functional block diagram of a circuit arrangement for executing instructions in a normal mode and in an alternative mode in accordance with another embodiment of the invention. The arrangement of FIG. 6 reduces the number of bits needed in a word of control word RAM 302 needed to address alternative-mode microcode in RAM relative to the arrangement of FIG. 5.

The address for the alternative-mode microcode is generated by substituting one bit that represents the alternative mode for a selected bit of the address within the control word. Thus, depending on the position of the bit that is substituted, the alternative-mode microcode may be offset from the normal-mode microcode by 1, 2, 4, 8, . . . address locations.

For the purpose of illustration, a 10-bit address is assumed for the circuit arrangement of FIG. 6. The bit value in alternative-mode enable register 32 is the bit that is selectively substituted for bit 8 of the address. Selector 304 selects between bit 8 of the address from control word RAM 302 and the bit from alternative-mode enable register 32 based on the alternative mode present signal contained in the control word. The microcode addresses i, i+1, and i+2 illustrate substituting for bit number 8 of [0 . . . 9].

Figure 7:
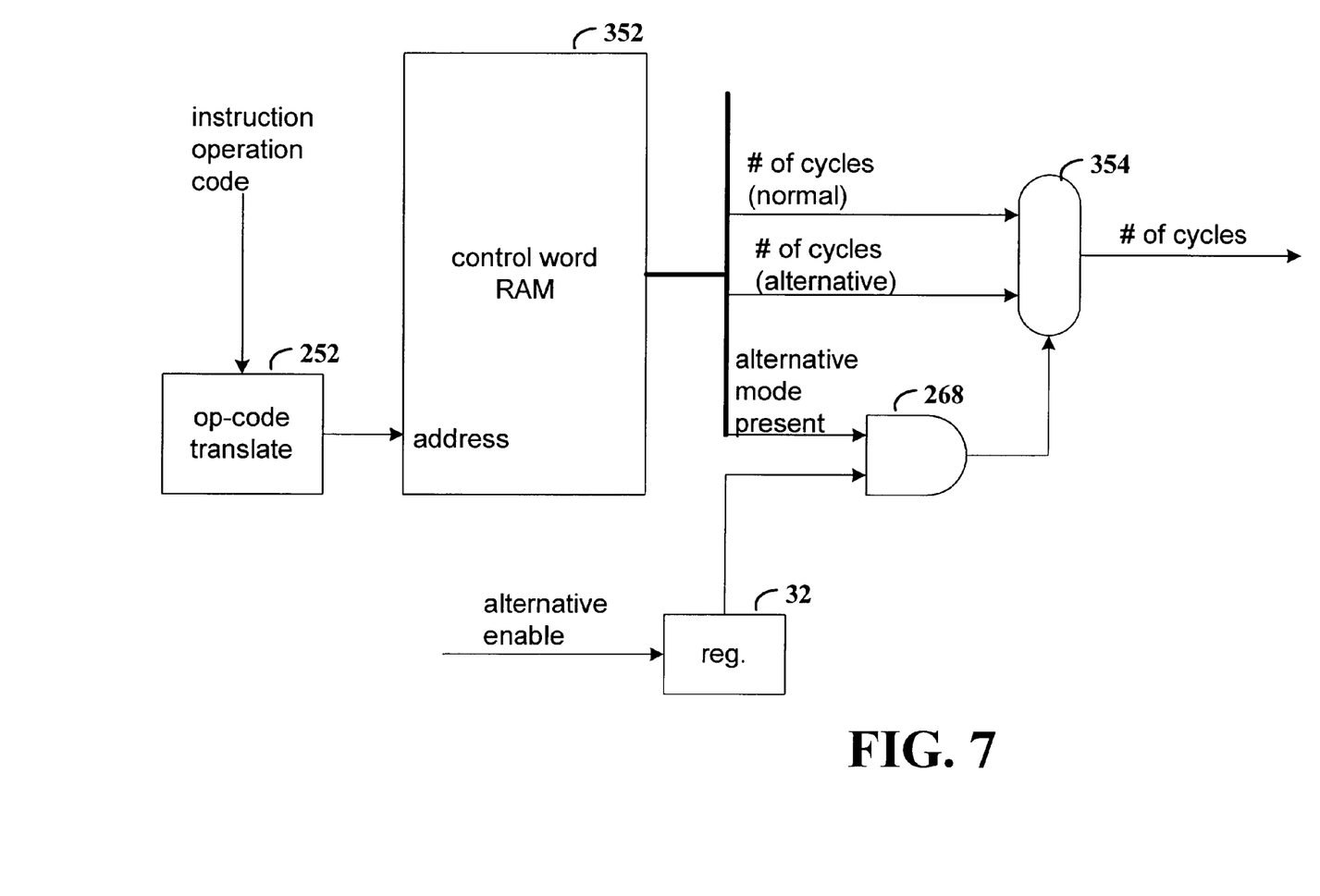
FIG. 7 is a block diagram of a circuit arrangement for slipping cycles of instruction processing for instructions having alternative modes of execution in accordance with one embodiment of the invention.

FIG. 7 is a block diagram of a circuit arrangement for slipping cycles of instruction processing for instructions having alternative modes of execution in accordance with one embodiment of the invention. It will be appreciated that most instructions native to instruction processors, such as the 2200 system processors, are processed within one instruction processor cycle. However there are certain complex instructions that require one or more additional cycles of the instruction processor. Where more than one cycle is required to complete execution of an instruction, the next instruction must not be allowed to enter the pipeline until the present instruction is within one cycle of completion. For instructions that can be completed in a single cycle, the number of cycles to wait is 0. For instructions that require additional cycle(s), the number of cycles to wait is contained within the associated control word of control word RAM 352.

Not only may some instructions require more than the single cycle of the general case, but instructions having alternative modes of execution may require a different number of cycles as between the normal mode and the alternative mode. Thus, a control word has bits that designate the additional number of cycles required for normal mode execution, the additional number of cycles required for alternative mode execution, and whether there is an alternative mode.

The bits of the control word for the number of additional cycles for normal mode execution and the bits for the number of additional cycles for alternative mode execution are input to selector 354. Selector 354 selects the number of additional cycles based on whether the control word for the instruction has an alternative mode and whether the alternative mode is enabled, as illustrated by AND gate 268. The selected number of cycles is then provided to other logic units of the instructions processor, for example instruction decode and dispatch logic 124 of FIG. 3.

The features of the arrangement of FIG. 7 can be combined with the features of FIGS. 5A and 6 as appropriate, depending on implementation requirements. It will be appreciated that implementations where only one instruction cycle is required to process any instruction in the instruction set, the arrangement of FIG. 7 would not be necessary.

Accordingly, the present invention provides, among other aspects, a circuit arrangement for dual-mode execution of computer instructions. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A circuit arrangement in a computer system for dual-mode execution of instructions having functions specified in operation codes, comprising:

a control word RAM having an address port and an output port, the control word RAM arranged for storage of a plurality of control words associated with the operation codes, respectively, wherein predetermined ones of the control words contain a first address referencing microcode for performing the function in a first mode and a second address referencing microcode for performing the function in a second mode, and predetermined ones of the words in the control word RAM include an alternative-mode-present bit indicating presence of the second address;

a selector having an output port and input ports coupled to the output port of the control word RAM, the selector arranged to receive and select between the first and second addresses responsive to a control signal;

a microcode RAM having an address port coupled to the output port of the selector and configured with a first set of microcode instructions associated with the first mode and a second set of microcode instructions associated with the second mode;

a register having an input port and an output port;

a logic circuit for driving a state of the control signal to the selector responsive to states of the alternative-mode-present bit and an alternative-mode-enable bit in the register; and instruction-execution circuitry coupled to the microcode RAM.

2. The circuit arrangement of claim 1, wherein the first mode is a mode native to the computer system, and the second mode is associated with processing platform-independent instruction.

3. The circuit arrangement of claim 1, further comprising an operation code translator having an input port arranged to receive the operation code and an output port coupled to the address port of the control word RAM.

4. The circuit arrangement of claim 1, further comprising means for selecting a number of instruction processing cycles to delay before fetching a next instruction relative to a first instruction having a first mode and a second mode.

5. The circuit arrangement of claim 1, further comprising an interpreter coupled to the register, wherein the interpreter is configured to set a bit in the register prior to interpreting platform-independent instructions.

6. The circuit arrangement of claim 5, wherein the interpreter is further configured and arranged to clear the bit in the register upon completing interpretation of a platform independent program.

7. A dual mode instruction execution system for instructions having operation codes, comprising:

control means for providing unique control signals associated with the operation codes, wherein first predetermined ones of said control signals select first microcode instruction sequences for performing selected functions in a first mode and second predetermined ones of said control signals select second microcode instructions sequences for performing selected functions in a second mode, wherein a first control signal indicates whether second microcode instructions are present and a second control signal indicates whether selection of the second microcode instructions is enabled;

selector means for selecting either said first mode or said second mode for a selected operation code responsive to the control signals;

microcode storage means for storing said first microcode instruction sequences and said second microcode sequences; and execution means coupled to said selector means and to said microcode storage means for selectively executing said first microcode instruction sequences or said second microcode instruction sequences, whereby the instruction functions are selectively executed in said first mode or said second mode.

8. A circuit arrangement in a computer system for dual-mode execution of instructions having functions specified in operation codes, comprising:

a control word RAM having an address port and an output port, the control word RAM arranged for storage of a plurality of control words associated with the operation codes, respectively, wherein each of the control words includes first address referencing microcode for performing the function in a first mode and predetermined ones of the words in the control word RAM include an alternative-mode-present bit indicating presence of a second address;

a selector having an output port, a first input port coupled to the control word RAM and arranged to receive a signal from a selected bit of the address from the control word, a second input port arranged to receive an alternative-mode address bit, and a selection port arranged to receive a signal from the alternative-mode-present bit, wherein the selector is arranged to select between the signal from the selected bit and the alternative-mode address bit, whereby selection of the alternative-mode address bit creates the second address referencing microcode for performing the function in a second mode;

a microcode RAM having an address port coupled to the control word RAM and to the output port of the selector, the microcode RAM configured with a first set of microcode instructions associated with the first mode and a second set of microcode instructions associated with the second mode; and instruction-execution circuitry coupled to the microcode RAM.

9. The circuit arrangement of claim 8, wherein the first mode is a mode native to the computer system, and the second mode is associated with processing platform-independent instructions.

10. The circuit arrangement of claim 8, further comprising an operation code translator having an input port arranged to receive the operation code and an output port coupled to the address port of the control word RAM.

11. The circuit arrangement of claim 8, further comprising means for selecting a number of instruction processing cycles to delay before fetching a next instruction relative to a first instruction having a first mode and a second mode.

12. The circuit arrangement of claim 8, further comprising:

a register having an input port and an output port, the register arranged for storage of an alternative-mode enable bit; and an interpreter coupled to the register, wherein the interpreter is configured to set the alternative-mode enable bit in the register prior to interpreting platform-independent instructions.

13. The circuit arrangement of claim 12, wherein the interpreter is further configured and arranged to clear the bit in the register upon completing interpretation of a platform independent program.

14. A method for dual-mode execution of computer instructions, comprising:

setting an enable flag upon commencement of interpretation of a platform independent program;

responsive to an operation code of an instruction, generating an address for a control word RAM having a plurality of control words, wherein predetermined ones of the control words contain a first address referencing microcode for performing the function in a native instruction mode and a second address referencing microcode for performing the function in a platform-independent mode, and the predetermined ones of the control words include an alternative-mode-present bit indicating presence of the second address, respectively;

reading a control word from the control word RAM responsive to the address generated;

if the enable flag is set and the alternative-mode-present bit is set in the control word, then selecting the second address of microcode to be executed, otherwise selecting the first address; and executing the microcode at the selected one of the first address and the second address.

15. The method of claim 14, further comprising clearing the enable flag upon completion of a platform-independent program.

16. A method for dual-mode execution of computer instructions, comprising:

setting an enable flag upon commencement of interpretation of a platform independent program;

responsive to an operation code of an instruction, generating an address for a control word RAM having a plurality of control words, wherein each of the control words includes a microcode RAM address referencing microcode for performing the function in a first mode, and predetermined ones of the words in the control word RAM include an alternative-mode-present bit;

reading a control word from the control word RAM responsive to the control word RAM address;

substituting a bit-value of the enable flag for a selected one of the bits of the microcode RAM address from the control word responsive to a signal at a first level from the alternative-mode-present bit; and executing the microcode at the microcode RAM address.

17. The method of claim 16, further comprising clearing the enable flag upon completion of a platform-independent program.

* * * * *